Oct. 3, 1933.  L. M. GOLDSMITH  1,929,309
CENTRIFUGAL PUMP
Filed March 22, 1929
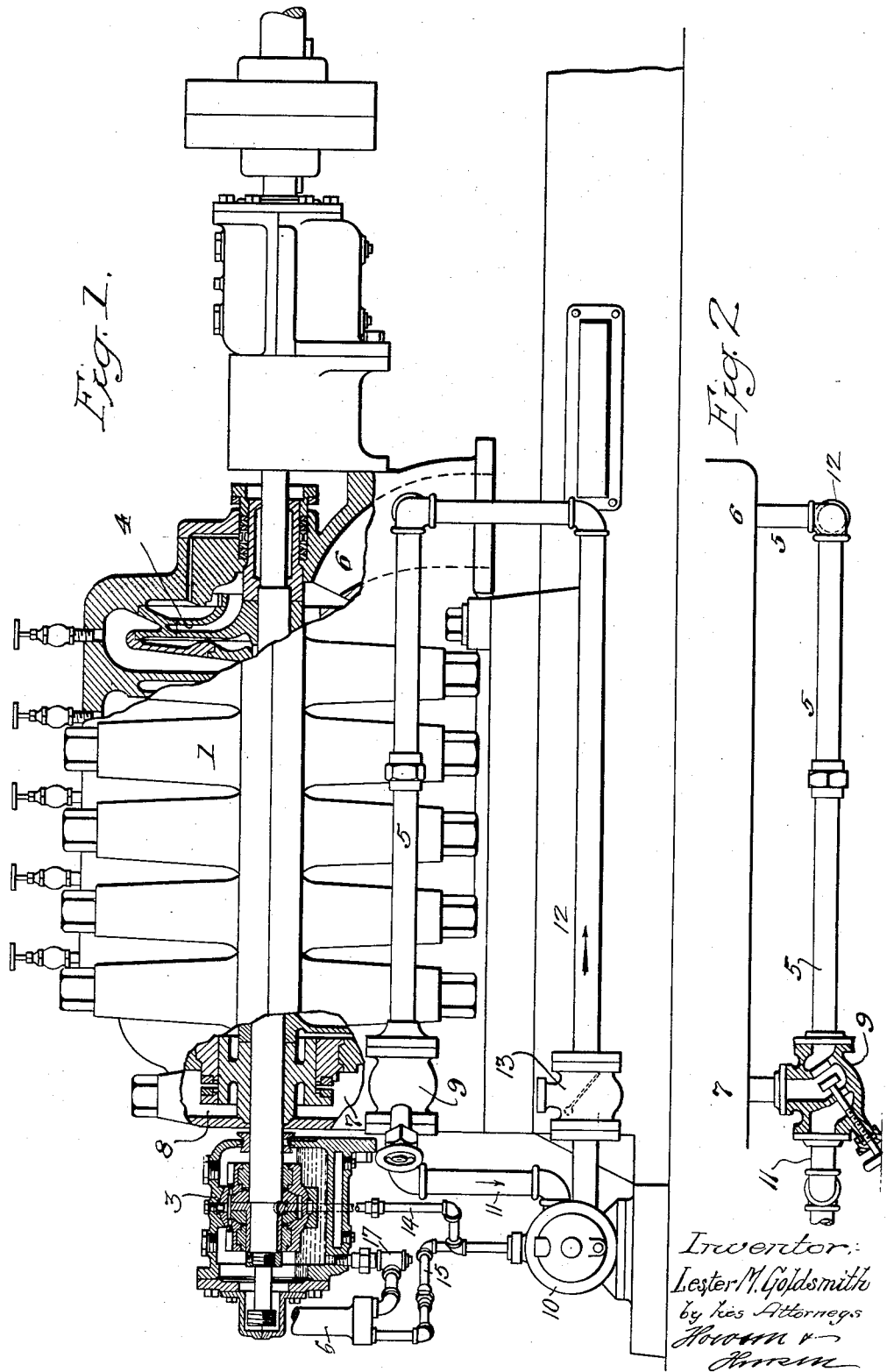
Inventor:
Lester M. Goldsmith
by his Attorneys Patented Oct. 3, 1933

1,929,309

UNITED STATES PATENT OFFICE 1,929,309

CENTRIFUGAL PUMP

Lester M. Goldsmith, Highland Park, Pa.

Application March 22, 1929. Serial No. 349,135

1 Claim. (Cl. 103—111)

The object of my invention is to utilize the liquid used for hydraulic balance in a centrifugal pump as the cooling agent for the lubricating oil circulating in the thrust bearing of the pump or other pumps or machines. This object I attain in the following manner, reference being had to the accompanying drawing, in which:

Fig. 1 is a side view, partly in section, of a multi-stage centrifugal pump illustrating my invention; and Fig. 2 is a plan view showing the balance pipe and its connections, the valve being in section.

The centrifugal pump shown in the drawing is a multistage pump of a given type, but it will be understood that my invention can be applied to any pump using an hydraulic balance.

Heretofore, the lubricating oil of the thrust bearing of the pump was cooled by a system using a portion of the liquid being pumped, but the power used in feeding the liquid to a cooler was wasted, as the oil was returned to the suction side of the pump. By my invention the balancing liquid of the pump is used as the cooling agent, and, therefore, the power is not wasted.

In the drawing, 1 is the body of the pump, having bearings for a longitudinal shaft. One end of the shaft is adapted to a thrust bearing 3 of any suitable type. On the shaft are a series of impellers 4.

A balance pipe 5 connects the suction chamber 6 of the pump with a discharge chamber 7 at the opposite end of the pump. 8 is the hydraulic balancing drum.

A valve 9 in the pipe 5 is a double-seated valve, which is so arranged that it can shut off either of one of the two connections, but always must be open on one, as the hydraulic balance must always be open from one end of the pump to the other, to balance out the maximum quantity of the end thrust.

The cooler 10 is of any suitable type and is connected to the valve 9 by a pipe 11 and to a return pipe 12 in which is a check valve 13. The pipe 12 is connected to the pipe 5 at the suction end of the pump.

The oil tube in the cooler is connected by a pipe 14 to the thrust bearing 3 and also connected by a pipe 15 with a gear pump 16 which in turn is connected to a pipe 17 leading from the bottom of the oil chamber of the thrust bearing 3.

The check valve 13 is automatic. By the manipulation of the double-seated valve 9 the liquid can be taken from the discharge chamber of the pump and put directly back into the suction chamber or back in the suction chamber after passing through the oil cooler 10.

When the double-seated valve is screwed all the way in, the pipe 5 remains full of liquid but out of communication with the chamber 7. Instead, the liquid flows from chamber 7 through the valve 9, thence through pipe 11 to and through the cooler 10, opens check valve 13, and through pipe 12 into chamber 6, thus balancing the pump through the cooler. When the double-seated valve is screwed out, it closes pipe 11. The liquid then flows from chamber 7 into the double-seated valve, through pipe 5 into chamber 6, balancing the pump direct. The pipe 12 remains full of fluid under pressure, closing the check valve 13, as there is no pressure fluid in the pipe 11.

In some instances I may use the balancing liquid in the pump not only to cool its thrust bearing but it may be used to cool a series of thrust bearings, and it may even be used to cool the lubricating oil of an internal combustion engine; and, in fact, in some instances, where the thrust bearing is not used in a centrifugal pump, and where an internal combustion engine is used to drive the pump, the balancing liquid may circulate through the lubricating oil cooler of the engine.

I claim:

The combination in a centrifugal pump having a suction chamber and a thrust balancing chamber; a balancing pipe communicating with both chambers; a three-way valve in said pipe; a cooler; a pipe leading from the valve to the cooler said valve being arranged to close either the passage from the balancing chamber to the cooler, or from the balancing chamber to the suction chamber of the pump; a pipe leading from the cooler and connected to the balancing pipe at the suction chamber; a check valve in said pipe; a pump bearing; and means for circulating lubricating oil to be cooled through the bearing and through the cooler.

LESTER M. GOLDSMITH.